US008583370B2

(12) United States Patent
Camacho et al.

(10) Patent No.: US 8,583,370 B2
(45) Date of Patent: Nov. 12, 2013

(54) IDENTIFYING A NETWORK RECORD CORRESPONDING TO A PARTICULAR ROUTING EVENT

(75) Inventors: Esteban Camacho, Belleville, MI (US); Matthew R. Waldner, Grosse Pointe Woods, MI (US)

(73) Assignee: General Motors, LLC, Detroit, MI (US)

( * ) Notice: Subject to any disclaimer, the term of this patent is extended or adjusted under 35 U.S.C. 154(b) by 57 days.

(21) Appl. No.: 13/344,161

(22) Filed: Jan. 5, 2012

(65) Prior Publication Data

US 2013/0179071 A1    Jul. 11, 2013

(51) Int. Cl.
*G01C 21/00*    (2006.01)

(52) U.S. Cl.
USPC .......................................................... 701/468

(58) Field of Classification Search
USPC ......... 701/400, 409, 410, 420, 424, 425, 446, 701/465, 468; 707/999.003, 999.006
See application file for complete search history.

(56) References Cited

U.S. PATENT DOCUMENTS

| | | | |
|---|---|---|---|
| 2003/0236818 A1* | 12/2003 | Bruner et al. | 709/200 |
| 2005/0049781 A1* | 3/2005 | Oesterling | 701/207 |
| 2006/0046740 A1* | 3/2006 | Johnson | 455/456.1 |
| 2008/0255754 A1* | 10/2008 | Pinto | 701/119 |

* cited by examiner

*Primary Examiner* — Mary Cheung
(74) *Attorney, Agent, or Firm* — Leydig, Voit & Mayer, Ltd.

(57) ABSTRACT

A method for associating routing event records with network records in a system including a GPS device, the method including: receiving, from the GPS device, a route request; sending, to the GPS device, route information corresponding to a route calculated based on the route request; storing, in a database, a routing event record corresponding to the sending of the route information; comparing a parameter of the routing event record with a corresponding parameter of a network record generated by a wireless carrier to determine whether the network record matches up with the routing event record; and associating the routing event record with the matched network record.

14 Claims, 4 Drawing Sheets

US 8,583,370 B2

IDENTIFYING A NETWORK RECORD CORRESPONDING TO A PARTICULAR ROUTING EVENT

TECHNICAL FIELD

The present disclosure relates generally to systems and methods for processing records associated with GPS (Global Positioning System) navigation.

BACKGROUND

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit is utilized to provide a subscriber with the telematics services.

A service conventionally provided by TSPs to users of telematics units is GPS navigation, which includes the provision of Turn-by-Turn (TBT) directions. In addition to GPS navigation being provided to drivers through GPS-based navigation aid devices (referred to herein as "GPS devices") integrated into or in communication with telematics units, GPS navigation may also be provided through stand-alone GPS devices.

To utilize GPS navigation services provided through a TSP, a user of the telematics unit provides a route request to the TSP. The route request includes a destination entered or selected by the user. The starting point for the route request is entered or selected by the user, or is the current location of the telematics unit. After the route request is sent to the TSP, the TSP sends corresponding route information to the telematics unit, which may include directions (e.g. provided through a display and/or through vocal instructions) to the user based on a calculated course from the user's current location to the user's destination.

When a user does not follow the directions and goes off-course (i.e., when the position of the vehicle is not on the calculated course), the telematics unit sends a reroute request to the TSP. The user manually sends a reroute request, for example, by entering a new destination. The TSP responds to reroute requests by sending route information to the telematics unit including directions based on a recalculated course from the user's updated current location or entered starting point to the appropriate destination.

The communications between the telematics unit and the TSP occur over a wireless network and are facilitated by a wireless carrier that provides communication services to the TSP. Both the wireless carrier and the TSP may independently retain records of communications related to route and reroute requests. However, because these records are retained independently, there is currently no way to identify records maintained by the wireless carrier that correspond to particular records maintained by the TSP.

The above body of information is provided for the convenience of the reader. The foregoing is a discussion of problems discovered and/or appreciated by the inventors, and is not an attempt to review or catalog the prior art.

SUMMARY

In one implementation, the present invention provides a method for associating routing event records with network records in a system including a GPS device. The method includes: receiving, from the GPS device, a route request; sending, to the GPS device, route information corresponding to a route calculated based on the route request; storing, in a database, a routing event record corresponding to the sending of the route information; comparing a parameter of the routing event record with a corresponding parameter of a network record generated by a wireless carrier to determine whether the network record matches up with the routing event record; and associating the routing event record with the matched network record.

In another implementation, the aforementioned steps are stored in the form of computer-executable instructions on a tangible, non-transient computer-readable medium.

In yet another implementation, the method includes: receiving a routing event record corresponding to the sending of route information by a call center to the GPS device; comparing a parameter of the received routing event record with a corresponding parameter of a network record generated by a wireless carrier to determine whether the network record matches up with the routing event record; and associating the routing event record with the matched network record.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In general terms, not intended to limit the claims, a system and method are provided for associating routing event records with network records. Although the exemplary implementations described herein refer specifically to routing event records generated by a TSP and network records generated by wireless carriers in the context of GPS navigation provided to a telematics unit on a vehicle, it will be appreciated that these implementations are merely exemplary and that the inventive principles described herein may be applied more broadly to other environments.

Figure 1:
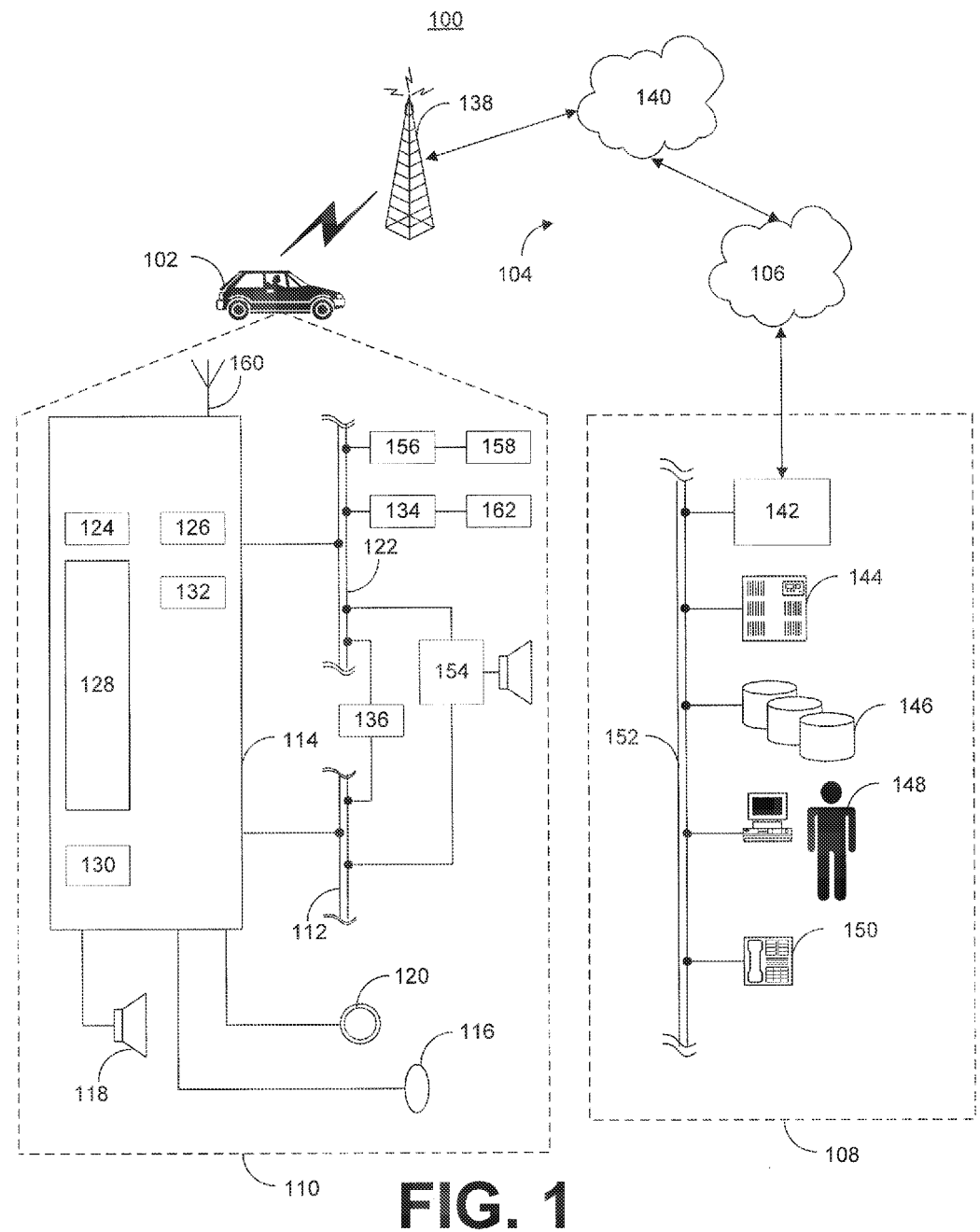
FIG. 1 is a schematic diagram of an operating environment for a mobile vehicle communication system usable in implementations of the described principles.

Given this overview, an exemplary environment suitable for various implementations is described hereinafter. It will be appreciated that the described environment is an example, and does not imply any limitation regarding the use of other environments. With reference to FIG. 1 there is shown an example of a communication system 100 that is used with the present method and system and generally includes a vehicle 102, a wireless carrier system 104, a land network 106 and a TSP call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modern 126 is called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

In this exemplary environment, GPS navigation services may be provided to the vehicle by the TSP call center 108 based on the geographic position information of the vehicle provided by the OPS based chipset/component 132. For example, a user of the telematics unit enters a destination using inputs corresponding to the GPS component, a route request is sent to the TSP call center 108, a route to a destination is calculated based on the destination address and a current position of the vehicle determined, at approximately the time of route calculation, and the route information is provided to the vehicle from the call center 108. Turn-by-turn (TBT) directions are further provided on a display screen corresponding to the GPS component and/or through vocal directions provided through a vehicle audio component 154.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions are sent and/or received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 contains a speaker system or utilizes speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center includes a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated by those of skill in the art that the execution of the various machine-implemented processes and steps described herein occur via the computerized execution of computer-executable instructions stored on a tangible computer-readable medium, e.g., RAM, ROM, PROM, volatile, nonvolatile, or other electronic memory mechanism. Thus, for example, operations performed by the telematics unit and/or GPS device are carried out according to stored instructions or applications installed on the telematics unit and/or GPS device, respectively.

Figure 2:
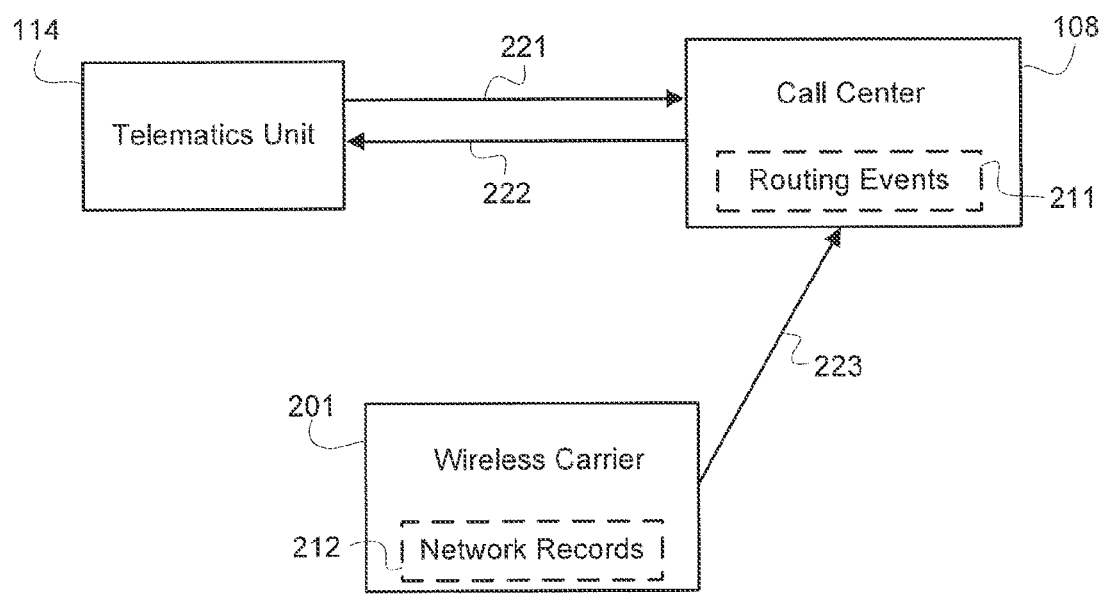
FIG. 2 is a diagram showing the relationship of the relevant entities with respect to processing records related to route and reroute requests in accordance with an implementation of the described principles.

With further reference to the exemplary system architecture of FIG. 1, and turning to FIG. 2, a diagram 200 showing the relationship of the relevant entities with respect to processing records related to route and reroute requests is depicted. The telematics unit 114 within the vehicle communicates wirelessly with call center 108 over a wireless network. These communications are facilitated by the wireless carrier 201. The telematics unit 11.4 sends route requests 221 (as used hereinafter, the term route request may refer to both route and reroute requests) to the call center 108, and the call center responds by sending route information 222 back to the telematics unit. Routing event records 211 corresponding to each route request 221 (along with the route information 222 associated to that route request) are generated and maintained at the call center. The communications between the telematics unit 114 and call center 108 occur over the wireless network, and the wireless carrier 201 that facilitates the communications between the telematics unit 114 and call center 108 may also generate and maintain network records 212 based on the wireless communications. These network records 212 may be transmitted 223 to the call center 108 as appropriate (e.g., periodically, upon request, immediately after generation, etc.).

A table of some of the exemplary fields that may be included in a routing event record is provided below as Table I. It will be appreciated that this is not an exhaustive list, and that other parameters may be included in a routing event record.

TABLE I

Routing Event Record Fields

| Field | Brief Description |
|---|---|
| CASE_ID | Identification string that identifies a call corresponding to a route request |
| DEST_CITY | Information pertaining to the destination corresponding to the routing event |
| DEST_COUNTY | |
| DEST_CROSS_STREET | |
| DEST_LAT | |
| DEST_LON | |
| DEST_STATE | |
| DEST_STREET_NAME | |
| DEST_STREET_NUM | |
| DEST_TYPE | |
| DEST_ZIP | |
| HARDWARE_GEN_ID | Identification of the version of hardware corresponding to telematics unit |
| ORIGIN_LAT | Location information pertaining to the vehicle origin or starting point |
| ORIGIN_LON | |
| RESPONSE_SIZE | Size corresponding to a routing event |
| ROUTE_ID | Identification string corresponding to a route |
| SRVC_DLVRY_PROCESSING_TIME | Information regarding the time at which the corresponding routing event was processed and when the routing information was transmitted to the telematics unit |
| SRVC_DLVRY_STATUS_CODE | |

TABLE I-continued

Routing Event Record Fields

| Field | Brief Description |
| --- | --- |
| STID | Identification string corresponding to the telematics unit |
| TOTAL_MANEUVERS | Information regarding number of maneuvers required by the provided route |

As can be seen from Table I above, a routing event record includes, among other information, identification information associated with a particular route request and the telematics unit from which the route request was received, information pertaining to the calculated route provided to the telematics unit, the time at which the route request was processed, and the size corresponding to the routing event. A routing event record corresponding to each route request (and each reroute request) received by the call center 108 is generated at the call center 108 and stored at a database at the call center 108. The source of the information contained within the routing event record may be from the route request (e.g., destination information, identification information pertaining to the telematics unit, etc.) or may be provided at the call center 108 (e.g., case identification number, time of processing, etc.).

The wireless carrier 201 maintains network records corresponding to communications between the call center 108 and the telematics unit 114. A table of some of the exemplary fields that may be included in a network record is provided below as Table II. It will be appreciated that this is not an exhaustive list, and that many other parameters may be included in a network record, As can be seen from Table II above, a network record includes, among other information, identification information, associated with the communication protocol and equipment used in carrying out a call, as well as information regarding when a call takes place and the amount of data transmitted during the call. The network record is generated by the wireless carrier 201 and stored at a database at the wireless carrier 201, and may be sent to the call center 108 so that the call center 108 can associate routing events with particular network records as described further below with respect to FIGS. 3 and 4. In an alternative implementation, it will be appreciated that the wireless carrier 201 may instead receive routing event records from the call center 108 (rather than the call center 108 receiving network records from the wireless carrier 201), and the wireless carrier 201 may perform association of network records to routing event records (as discussed further below).

Figure 3:
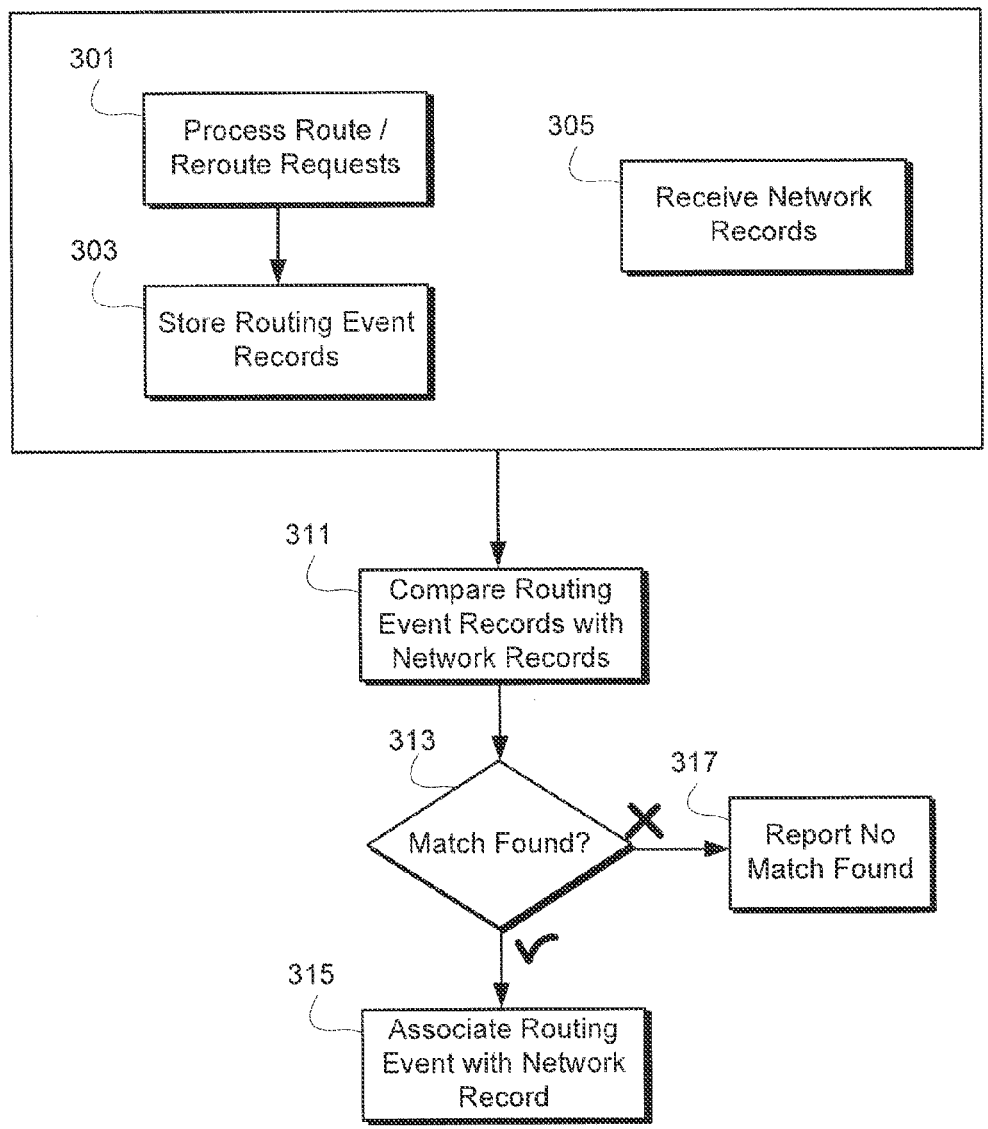
FIG. 3 is a flowchart illustrating a process for associating routing event records with network records in accordance with an implementation of the described principles.

Turning to FIG. 3, a process 300, including steps for associating routing event records with network records, is depicted in an exemplary implementation where the TSP call center performs the association. The call center receives route requests (including reroute requests) as described above from a telematics unit, determines appropriate route information, and sends that route information to the telematics unit (i.e.,

TABLE II

Network Record Fields

| Field | Brief Description |
| --- | --- |
| DATE_RCD_DATA | Date that a packet data call was made (in local switch time) |
| SWITCH | Accounting Home Agent |
| MDN | Mobile Directory Number—the number used to call the telematics unit |
| MIN | Mobile Identification Number—the number used by the cellular component for identification (not always the same as the MDN) |
| GMT_START_TIME | Time at which a call began (in GMT) |
| GMT_END_TIME | Time at which a call ends (in GMT) |
| SESSION_DURATION | Length of a call (in seconds) |
| MOBILE_IP_ADDRESS | IP address assigned to a telematics unit by the wireless carrier during a call |
| SID | System IDentifier—the identifier broadcast over-the-air for a particular area |
| MSCID | Identifier associated with the switch used to set up the call |
| CELL_ID | Identifier associated with the last cell site used in the call |
| SERVICE_OPTION | Code corresponding to a service option for packet data (e.g., 0 = Unknown, 12 = 2G, 33 = 1x, 59 = EvDO) |
| IP_TECH_INDICATOR | Code indicating the type of connection (1 = SIMPLE IP (SIP); 2 = Mobile IP (MIP)) |
| RELEASE_INDICATOR | Code corresponding to reason for stopping a record |
| MIP_HA_IP_ADDRESS | IP address of the Home Agent being used in a MIP session (set to 0 or −1 for SIP sessions) |
| ORIGINATING_BYTE_COUNT | Number of bytes sent from telematics unit |
| TERMINATING_BYTE_COUNT | Number of bytes sent to telematics unit | the call center processes route and reroute requests at stage 301). At stage 303, based on the processing of these requests, the call center generates and stores routing event records at a database at the call center, where each routing event record corresponds to a particular route request. During stage 305, the call center also receives network records from a wireless carrier. These network records may be received pursuant to a request sent from the call center to the wireless carrier, may be retrieved from the wireless carrier periodically and automatically, may be provided by the wireless carrier periodically and automatically, or may be received in any other appropriate manner. A comparison between routing event records and network records, for example, is triggered automatically when network records are received, or, alternatively, when an association between a routing event record and a network record is desired (e.g., for a purpose such as troubleshooting or a specific billing inquiry).

During stage 311, the call center compares the network records to a routing event. If, at stage 313, a match is found, then control passes to stage 315 wherein the routing event record is associated with the matching network record (e.g., the call center identifies a network record that matches the routing event record and optionally maintains records of the associations or adds a field to the routing event record that contains an identifier corresponding to the matching network record). If, at stage 313, no match is found, the call center is notified that no match is found by the computer-implemented system performing the comparison at the call center at stage 317. It will be appreciated that the "stages" referred to herein need not occur exactly in the order as described above, and need not be separate steps (e.g., the comparison at stage 311 and whether a match is found at stage 313 are both part of an overall process of comparing routing event records with network records).

Figure 4:
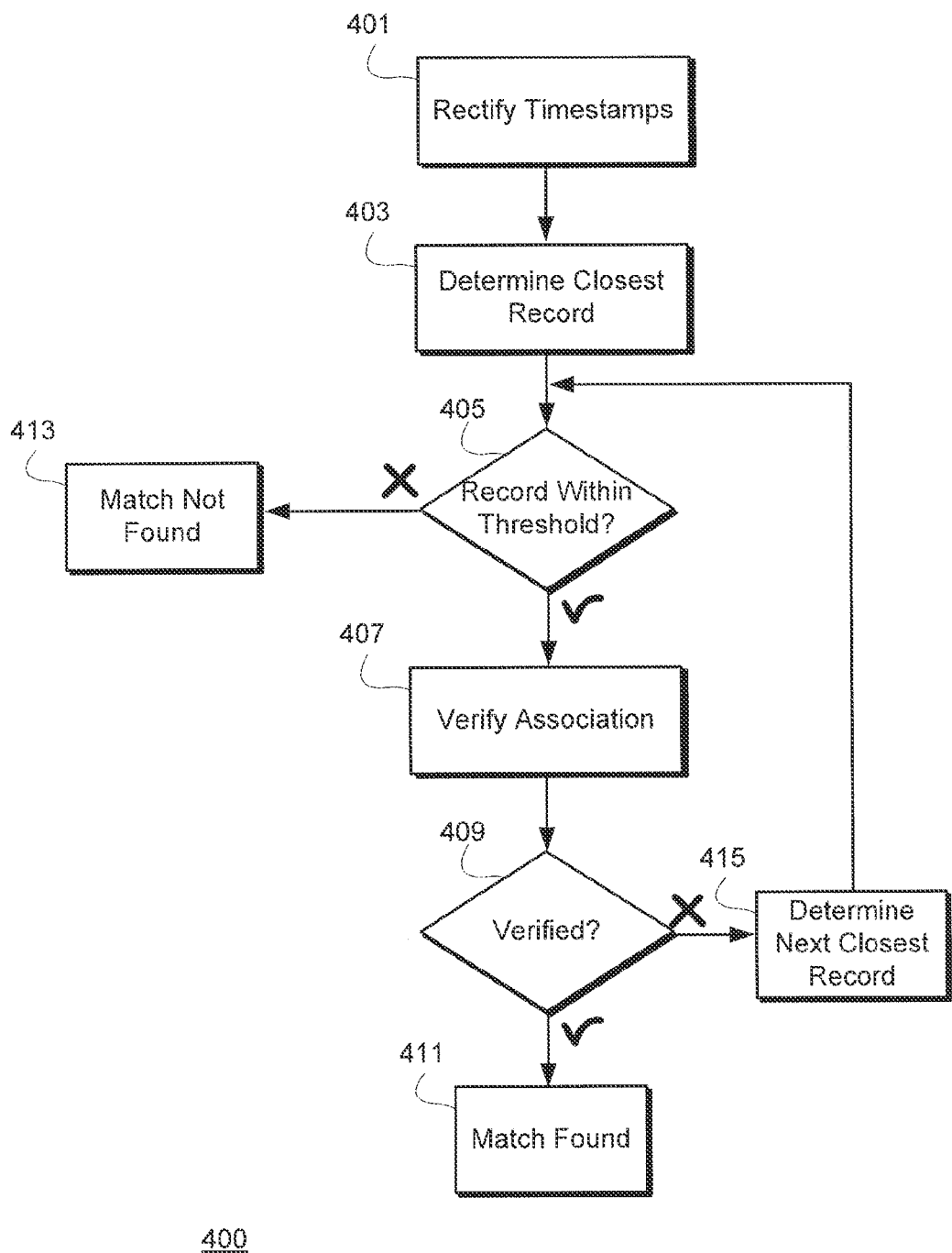
FIG. 4 is a flowchart illustrating details of matching a network record with an associated routing event record in accordance with an implementation of the described principles.

Further details of matching a network record with an associated routing event record are shown in the flowchart 400 of FIG. 4. In an exemplary implementation, routing event records and network records may include timestamps with the time in different formats. For example, the network data record may include a timestamp in GMT format while the routing event record includes a timestamp in EST (Eastern Standard Time) format. Thus, at stage 401, the entity performing the comparison (i.e., the call center in this exemplary implementation), rectifies the timestamps of network records with routing event records by converting the network records to EST. It will be appreciated that in another exemplary implementation, the routing event record timestamps are converted to GMT. It will further be appreciated that this rectification of timestamps is performed at any time, including but not limited to upon receiving network records from the wireless carrier or when an association between a network record and a routing event is needed.

At stage 403, the call center determines which routing event record and network record are closest in time. For example, if the call center is searching for a network record that corresponds to a particular routing event record, the call center selects the network record that is closest in time to that routing event record. In another example, if the call center is searching for a routing event record corresponding to a particular network record, the call center selects the routing event record that is closest in time to that network record. Furthermore, determining the closest record is, for example, limited to a certain threshold time period. For example, during stage 405, if no record is found with a timestamp that is within ten seconds of the timestamp of the particular routing event record or the particular network record, the call center determines that no record has been found within the threshold and reaches a conclusion that no match is found (shown as stage 413). This threshold time period helps prevent records that do not correspond to one another from mistakenly being associated with one another.

If, during stage 405, a closest record is found within the threshold time period, then control passes to stage 407 wherein the call center then verifies whether the two records are associated. In one exemplary implementation, this verification is performed by comparing size information contained in both records and determining whether the size information (e.g., number of bytes transmitted) contained in the network record is between ten to fifteen percent larger than the size information (e.g., number of bytes transmitted) contained in the routing event record. It will be appreciated that the size information contained in the network record is larger than the size information in a corresponding routing event record because of overhead (e.g., header information, address information, etc.). It will also be appreciated that the range used to perform the verification is potentially varied depending on how the size of the routing events and corresponding network transactions are determined, and depending on how much error tolerance is desired (e.g., a larger range may result in more associations being verified but may also result in more false positives). It will further be appreciated that other parameters of the network record and the routing event record other than size may be used to verify the association between records.

If, at stage 409, the verification is successful, then control passes to stage 411 wherein the call center determines that a match is found. If the verification is not successful (as shown at stage 409), control passes to stage 415 wherein the call center looks to the next closest record, and repeats the process of determining whether it is within a threshold time period and verifying the association. Alternatively, if verifying is not successful, control passes from stage 409 to stage 413 and the call center simply reports that a match was not found.

In a further implementation, the process shown in FIG. 4 is modified to address a situation where more than one routing event record is associated with a single network record. This potentially occurs when route requests or re-route requests are sent to the call center within a short time (e.g., within two minutes), and the wireless network provider considers the multiple requests as part of a single network session and maintains only one network record corresponding to the multiple routing event records. Thus, if no single routing event record can be found that matches with a single network record, the call center may combine routing event records that have timestamps that are close in time (e.g., within another threshold time period such as two minutes) and compare the combined parameter (e.g., size) with the network record or network records that are closest in time to the combined routing event records.

In one implementation, having identified a network record that corresponds to a particular routing event (or vice-versa), a call center or wireless carrier uses the associated records to troubleshoot suspected issues pertaining to vehicle hardware or telecommunications hardware. In other implementations, these associated records are used to forecast data usage for other types of telematics services and estimate future network usage as well as billing costs. In yet another implementation, the associated records are used to tune the operation of the call center and the wireless carrier, for example, by adjusting session duration or connection frequency.

It will be appreciated that other implementations may differ in detail from foregoing examples. As such, all references to the invention, are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value failing within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for associating routing event records with network records in a system including a GPS (Global Positioning System)-based navigation aid device, comprising:
   receiving, from the GPS device, a route request;
   sending, to the GPS device, route information corresponding to a route calculated based on the route request;
   storing, in a database, a routing event record generated by a call center corresponding to the sending of the route information in response to the route request, the routing event record including at least one of time information indicating when the route information was sent to the GPS device and size information indicating size of the route information sent to the GPS device;
   comparing at least one of the time information and the size information of the routing event record with information of a network record generated by a wireless carrier network corresponding to the route information being sent to the GPS device to determine that the network record matches up with the routing event record; and
   associating the routing event record with the determined corresponding network record.

2. The method of claim 1, wherein the association is performed by the call center, and the network record is received by the call center from the wireless carrier.

3. The method of claim 1, further comprising:
   rectifying timestamps of the routing event record and the network record.

4. The method of claim 1, wherein the comparing further comprises:
   determining that a timestamp of the network record is closest in time to a timestamp of the routing event record relative to other network records and within a threshold time period in relation to the timestamp of the routing event record.

5. The method of claim 1, wherein the comparing further comprises:
   determining that at least one of time information and size information of the network record is within a range of the at least one of time information and size information of the routing event record.

6. The method of claim 1, wherein the comparing further comprises:
   comparing a combination of routing event records, including the routing event record, with the network record.

7. A method for associating network records with routing event records in a system including a GPS (Global Positioning System)-based navigation aid device, comprising:
   receiving a routing event record generated by a call center corresponding to the sending of route information by a call center to the GPS device in response to a route request to the call center from the GPS device, the routing event record including at least one of time information indicating when the route information was sent to the GPS device and size information indicating size of the route information sent to the GPS device;
   comparing at least one of the time information and the size information of the received routing event record with information of a network record generated by a wireless carrier network corresponding to the route information being sent to the GPS device to determine that the network record matches up with the routing event record; and
   associating the routing event record with the determined corresponding network record.

8. The method of claim 7, wherein the association is performed by the wireless carrier.

9. A tangible, non-transient computer-readable medium, part of a call center, having computer-executable instructions for associating routing event records with network records in a system including a GPS (Global Positioning System)-based navigation aid device stored thereon, the computer-executable instructions comprising instructions for:
   receiving, from the GPS device, a route request;
   sending, to the GPS device, route information corresponding to a route calculated based on the route request;
   storing, in a database, a routing event record generated by the call center corresponding to the sending of the route information in response to the route request, the routing event record including at least one of time information indicating when the route information was sent to the GPS device and size information indicating size of the route information sent to the GPS device;
   comparing at least one of the time information and the size information of the routing event record with information of a network record generated by a wireless carrier network corresponding to the route information being sent to the GPS device to determine that the network record matches up with the routing event record; and
   associating the routing event record with the determined corresponding network record.

10. The computer-readable medium of claim 9, wherein the call center is configured to receive the network record from the wireless carrier.

11. The computer-readable medium of claim 9, further comprising instructions for:
   rectifying timestamps of the routing event record and the network record.

12. The computer-readable medium of claim 9, wherein the comparing further comprises:
   determining that a timestamp of the network record is closest in time to a timestamp of the routing event record relative to other network records and within a threshold time period in relation to the timestamp of the routing event record.

13. The computer-readable medium of claim 9, wherein the comparing further comprises:
   determining that at least one of time information and size information of the network record is within a range of the at least one of time information and size information of the routing event record.

14. The computer-readable medium of claim 9, wherein the comparing further comprises:
   comparing a combination of routing event records, including the routing event record, with the network record.

\* \* \* \* \*